(12) United States Patent
Chaskin

(10) Patent No.: US 7,157,658 B2
(45) Date of Patent: Jan. 2, 2007

(54) METHOD AND APPARATUS FOR FABRICATING DRY CELL BATTERIES

(76) Inventor: Jeffrey R. Chaskin, 841 NW. 126 Ave., Coral Springs, FL (US) 33071

(*) Notice: Subject to any disclaimer, the term of this patent is extended or adjusted under 35 U.S.C. 154(b) by 270 days.

(21) Appl. No.: 10/827,635

(22) Filed: Apr. 20, 2004

(65) Prior Publication Data
US 2005/0230358 A1 Oct. 20, 2005

(51) Int. Cl.
B23K 1/00 (2006.01)

(52) U.S. Cl. .................................... 219/85.15

(58) Field of Classification Search ............ 219/85.14, 219/85.15; 429/158, 159, 160, 161
See application file for complete search history.

(56) References Cited

U.S. PATENT DOCUMENTS

| | | | |
|---|---|---|---|
| 2,390,890 A | * | 12/1945 | MacFarland ............ 219/85.15 |
| 2,436,887 A | * | 3/1948 | Hensley .................. 219/85.14 |
| 2,575,976 A | * | 11/1951 | Rock ........................ 429/160 |
| 3,621,193 A | * | 11/1971 | Low ........................ 219/85.14 |
| 4,186,246 A | | 1/1980 | Sugalski |
| 4,262,414 A | | 4/1981 | Sugalski |
| 4,306,355 A | | 12/1981 | Hawrylo et al. |
| 4,315,364 A | * | 2/1982 | Leffingwell ................ 429/7 |
| 4,501,943 A | | 2/1985 | Lund |
| 4,523,068 A | | 6/1985 | Lund et al. |
| 4,642,442 A | | 2/1987 | Mullane et al. |
| 4,656,336 A | * | 4/1987 | Goodey .................. 219/85.14 |
| 4,661,668 A | | 4/1987 | Mullane et al. |
| 5,202,198 A | | 4/1993 | Mix et al. |
| 5,776,207 A | | 7/1998 | Tsuchida et al. |
| 5,834,743 A | | 11/1998 | Lund et al. |
| 5,836,371 A | | 11/1998 | Kump et al. |
| 5,886,325 A | | 3/1999 | Lund |
| 6,010,800 A | | 1/2000 | Stadnick et al. |
| 6,265,091 B1 | | 7/2001 | Pierson et al. |

FOREIGN PATENT DOCUMENTS

JP 360000053 1/1985

* cited by examiner

Primary Examiner—Clifford C. Shaw
(74) Attorney, Agent, or Firm—Kenneth E. Merklen

(57) ABSTRACT

A method and apparatus is disclosed for fabricating a dry cell storage battery from a plurality of dry cells by soldering a battery strap to terminals of adjacent dry cells in a battery pack. A resistance heat solder apparatus is provided for soldering a joint defined by an end portion of a battery strap and a terminal of a dry cell, so that adjacent dry cells in the battery pack are in physical and electrical contact. Terminal probes, connected across the secondary coil of a step-down transformer, are used to make contact with the joint to be soldered for applying a voltage across the joint. Terminal probes have contoured tips. A preferred embodiment provides terminal probes which are contoured to be a mirror image of the contour of the joint where the particular terminal probe makes contact with the solder joint. Application of a voltage across the joint provides a collimated current flow path through the joint. An intense heat is created within the joint by the current flow.

12 Claims, 2 Drawing Sheets

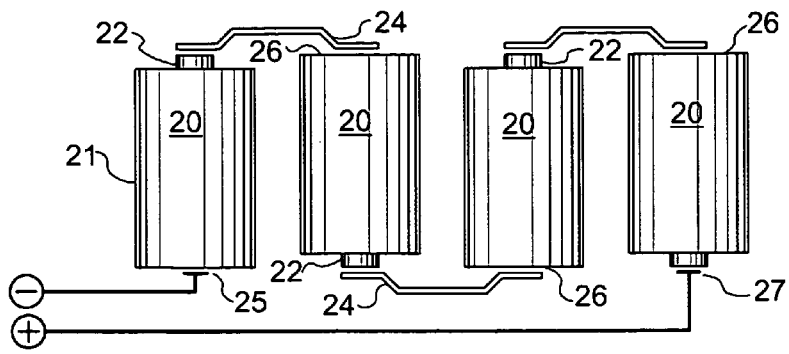
Fig. 2
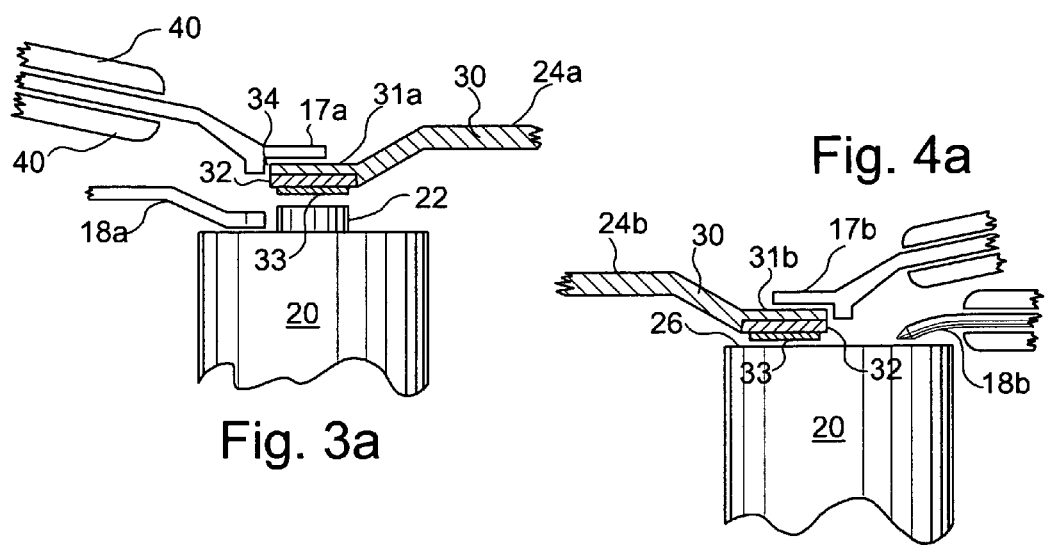
Fig. 4a
Fig. 3a
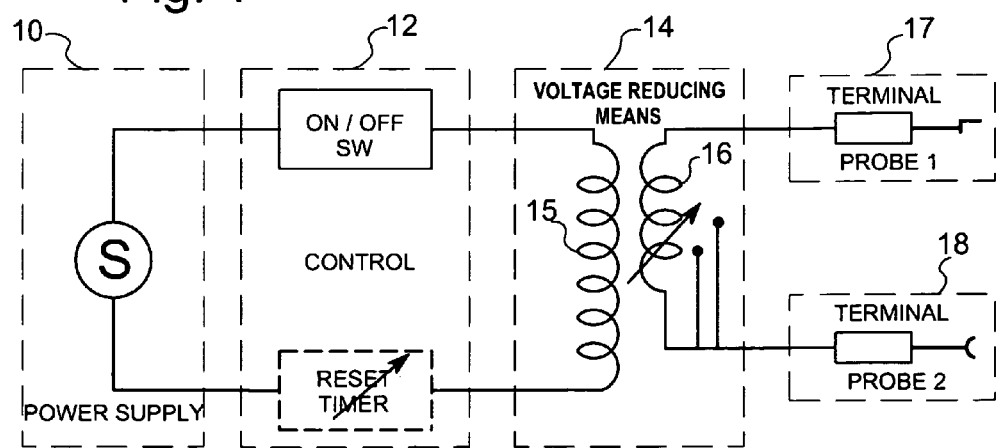
Fig. 1

METHOD AND APPARATUS FOR FABRICATING DRY CELL BATTERIES

BACKGROUND OF THE INVENTION

1. Field of the Invention

The present invention relates to the field of batteries, particularly fabricating dry cell storage batteries from a plurality of dry cells.

2. Prior Art

Dry cell storage batteries serve as the electric power source for driving toy vehicles, such as automobiles, jeeps, trucks, boats and airplanes, for example. Dry cell storage batteries, such as 9.0 volt dry cell storage batteries, for example, are fabricated by electrically connecting six (6), 1.5 volt electrolytic cells or dry cells, held in a battery pack, in series connection, using battery straps to connect opposite terminals of adjacent dry cells and connect the open positive and negative terminals as the power terminals of the battery pack. An electrolytic cell or dry cell is a complete battery, available on the open market in rechargeable and non-rechargeable form. Several dry cells may be put in a jig, forming and supporting a battery pack which defines a dry cell storage battery. This type of battery pack permits the use of non-rechargeable dry cells with removal and exchange of dry cells as the dry cells in the battery pack become drained of power. With the dry cell exchange arrangement, a relatively large quantity of dry cells need be keep on hand for rejuvenating the battery by substituting a good or charged dry cell for a drained dry cell as one or more of the cells in the battery expire. The expired dry cells are discarded. This is expensive and inconvenient. Also, the jig for supporting the battery pack must be very strong because the vehicle driven by the jig supported battery pack is often subjected to very rough and vigorous usage, especially when the driven toy vehicle is used in competition. Further, when used in competition there are weight and size limitation requirements of the battery pack so as to virtually eliminate the use of heavy and/or bulky material defining the jig for supporting the battery pack or dry cell storage battery. Because of these limitations, the preferred process for holding a plurality of dry cells together in a battery pack is by hot soldering the dry cells together using battery straps. The battery strap is hot soldered to terminals of adjacent dry cells in the battery pack, both physically and electrically coupling the dry cells together in a dry cell storage battery. Since hot soldering is a permanent connection, it is practical to use rechargeable dry cells as the basic source of power of the dry cell storage battery. A battery charger may be used for charging the dry cells of the dry cell storage battery when power, in the dry cells, is exhausted. Soldering the dry cells together, using battery straps to electrically connect and secure the rechargeable dry cells into a rechargeable battery unit is a good and reasonable solution for the need required by the driven toys. The dry cell battery, which is conveniently rechargeable, is compact in size, with securely held cells in a handy package. A battery charger is used to recharge the spent and discharged dry cells of the battery. Carrying around a supply of new dry cells is no longer required. Disposing of exhausted dry cells is no longer necessary. The rechargeable battery pack is charged, used and drained of power, recharged and used again and recharged again.

Soldering is conventionally done, using a hot soldering process. The tools may include a soldering iron which may be a flame heated iron or an electrically heated iron, or a soldering torch, an open flame. During the process of conventional soldering, heat is generated in and/or retained by the soldering apparatus and the heat is applied or transferred to the pieces being soldered together and the solder itself. During the soldering process, using conventional soldering apparatus, the amount of heat generated by the soldering apparatus is substantially in excess of the heat actually needed to fabricate a good solder joint or connection. This is because heat must be generated and/or carried by a carrier, a soldering iron, for example, and transferred from the heat carrier to the pieces or units to be soldered together and to the solder, which is to liquify and join the units. Some heat is lost in the act of heat transfer. More heat, errant heat, is lost in the mass of material adjacent the joint to be soldered. Errant heat is a problem when soldering a dry cell to fabricate and/or enhance a dry storage battery. It is well known that heat is an enemy of a dry cell. Heat changes dry cell chemical characteristics, reducing dry cell longevity and therefore battery longevity.

Preferably, soldering is accomplished without minimizing nor maximizing the heat used for the soldering process, while accomplishing the soldering process in the shortest possible time duration, and obtaining a good solder connection. Another factor that may be considered is limiting the area heated during the soldering process, as much as possible to the absolute area or joint being soldered. One way to limit the area heated during the soldering process is to induce or generate the heat used for soldering in the elements of the joint to be soldered and the solder, itself. One way of generating soldering heat within the mass of a joint to be soldered is by using a microwave induction heating process. In a microwave induction heating process, microwave energy is directed or applied to a coil and the joint or area to be soldered is inserted into the coil. Microwave energy passed through the coil induces or generates heat in the conductive material within the coil. This is the subject of a pending patent application of the applicant herein. The pending patent application identified by the Ser. No. 10/657,077, and filed Sep. 09, 2003 is titled Apparatus And Method For Fabricating Dry Cells into Batteries Using RF Induction Heating. While in many cases microwave induction heat soldering provides a good solder joint, it is difficult to limit the area heated by microwave induction heating apparatus to the junction of the joint to be soldered. In addition, microwave induction heat soldering apparatus is expensive and limited in use.

Some issued United States patents of interest include:

| | | |
|---|---|---|
| 4,186,246 | to Sugalski | Jan. 29, 1980; |
| 4,262,414 | to Sugalski | Apr. 21, 1981; |
| 4,306,355 | to Hawrylo et al | Dec. 22, 1981; |
| 4,501,943 | to Lund | Feb. 26, 1985; |
| 4,523,068 | to Lund et al | Jun. 11, 1985; |
| 4,642,442 | to Mullane et al | Feb. 10, 1987; |
| 4,661,668 | to Mullane et al | Apr. 28, 1987; |
| 5,202,198 | to Mix et al | Apr. 13, 1993; |
| 5,776,207 | to Tsuchida et al | Jul. 07, 1998; |
| 5,834,743 | to Lund et al | Nov. 10, 1998; |
| 5,836,371 | to Kump et al | Nov. 17, 1998; |
| 5,886,325 | to Lund | Mar. 23, 1999; |
| 6,010,800 | to Stadnick et al | Jan. 04, 2000. |

Although the above U.S. issued patents mention and relate to electric storage batteries and cells, the batteries of interest in the above patents are limited to lead-acid batteries and the cells referred to are sheets of lead contained in a battery housing. The U.S. Pat. No. 6,265,091, issued to Pierson et al Jul. 24, 2001 teaches a modular electric storage battery, with substitution or exchange of individual batteries within the modular unit that may be used as a starting, lighting and ignition battery, preferably on motorcycles but on other motor vehicles also. The modular electric storage battery is proposed as a substitute for a lead-acid battery, normally used in motor vehicles.

SUMMARY OF THE INVENTION

The present invention provides a novel method and apparatus for enhancing and/or fabricating a dry storage battery from a plurality of electrolytic cells or dry cells, each of which is a self-contained battery. A plurality of dry cells are arranged in a pack so that adjacent dry cells are in juxtaposition. This is normally referred to as a battery pack. Terminals of adjacent dry cell are electrically connected. Preferably, a battery strap, which is a conductor, is electrically connected to terminals of adjacent dry cells by soldering one end of the battery strap to one terminal of one dry cell and the other end of the same battery strap to a terminal of an adjacent dry cell, for example, thus connecting the two dry cells electrically and physically. The present invention provides for using a resistance heat solder apparatus or system for soldering joints of adjacent dry cell in a battery pack. Each joint to be soldered is defined by the junction of a terminal of one dry cell and one end of a battery strap.

The resistance heat solder apparatus includes a voltage reducer means, such as a step-down transformer, for example, with the primary coil and a secondary coil. The primary coil is provided with a connection to a normal electric power supply, for example, 110–120 volts, Alternating Current (VAC), for driving the resistance heat solder apparatus. An ON/OFF switch, preferably in the circuit of the primary coil, is provided for activating and deactivating the resistance heat solder apparatus. The ON/OFF switch may include a timer means for limiting the ON time for soldering. The timer means may be adjustable, with respect to the interval timed. The output voltage of the secondary coil of the step-down transformer is applied across the joint to be soldered by making contact on opposite sides or surfaces of the joint by each of a pair of open terminal probes connected to opposite ends of the secondary coil. A collimated current path across the joint, between the two terminal probes, is created. Current flow through the collimated path across the joint, generates an intense and immediate heat in the conductor material of the joint defining the collimated path. The intensity of the heat generated in the body of the joint is a function of the resistivity of the conductive material in the collimated current path between the two terminal probes and the level of voltage applied across the joint. The heat generated in the body of the joint is generated in a collimated path corresponding to the collimated current flow path between the positive and negative terminal probes making contact with the outer surfaces of the joint to be soldered. Using a resistance heat solder apparatus or system, an intense, localized heat is generated within the body of the joint to be soldered. The terminal probes of the resistance heat solder apparatus may be fabricated from an highly conductive, very hard material or combination of materials, such as copper clad stainless steel, for example. However, a terminal probe having at least a tip of approximately 2% thorium tungsten, is preferred. Although the terminal probe may have a conical tip a preferred embodiment of the invention provides for contouring the terminal probes of the resistance heat solder apparatus for providing predetermined, surface contacts between a probe and an outer surface of the joint to be soldered, creating a predetermined, collimated current flow path through or across the body of the joint to be soldered.

Since heat is generated in an internal path corresponding to the collimated, current flow path between the positive and negative output terminal probes of the secondary coil of the resistance heat solder apparatus in contact with outer surfaces of the body of the joint, the invention provides for contoured terminal probes, contoured in mirror image of the outer surface of the joint with which the probe makes contact, for soldering. While the tip of a conical contoured probe provides a solid, positive contact resulting in a defined current path between the probes, mirror image contoured probes provide a full, flush contact, at the point of contact so that a direct, predetermined, electric current flow path between the two terminal probes, through the body of the joint to be soldered, is created. Rapid and intense heat is generated in the limited area of the conductor material defining the joint to be soldered, and within a predetermined electric current flow path, thereby limiting the area of the joint in which a soldering heat is generated. By applying a voltage across a joint to be soldered in a predetermined collimated current flow path, localized and intense heat is introduced in a predetermined path through the joint to be soldered. By generating a localized, collimated heat path within the body of the joint to be soldered, heat in the mass surrounding the collimated current flow path is reduced. Errant heat is virtually eliminated and thermal shock to materials adjacent the soldered area is substantially reduced. With the rapid generation of intense heat limited to a path that is both predetermined and collimated, the duration of ON time becomes very important and an ON/OFF timer is provided, which may be adjusted for ON time. The intensity of heat is also important, that is, sufficient heat should be generated within the body of the joint to liquify the solder material. However, excess heat should be avoided. Since the intensity of heat generated is a function of the voltage level and the resistivity of the conductor across which the voltage is applied, the resistivity of the conductor material may be determined and the output voltage level may be adjusted. Thus, the secondary coil includes one or more taps so that the output voltage of the secondary coil may be adjusted. It has been found that an output voltage of from +1.0 volts to +10.0 volts may be used, depending on the resistivity of the materials defining the joint to be soldered. If a battery strap portion of the joint includes a copper core and with a nickel-steel or chrome-steel coat or cladding, for example, a voltage level of +4.0 volts to +6.0 volts, for example, may be applied across the joint. If the battery strap is a solid copper core clad with a silver coat, for example, the voltage applied across the joint may be of a lower level, of from +1.0 volts to +2.0 volts, for example.

Preferably a layer of solid solder is placed between the battery strap and the dry cell terminal, the solder to be changed from a solid state to a liquid state by the induced heat. Upon deactivation of the resistance heat solder apparatus, generation of heat within the joint ceases and the heat generated begins to dissipate, cooling the joint and returning the liquified solder to a solid state, soldering the joint. Alternatively, one or both of the inside surfaces defining the joint to be soldered may be tinned.

BRIEF DESCRIPTION OF THE DRAWINGS

FIG. 1 is a block diagram representing a resistance heat solder apparatus usable in the invention;

FIG. 2 is a representation of a battery pack fabricated from four (4) dry cells;

FIG. 3a is a representation of the apparatus represented in FIG. 3, in side elevation view;

FIG. 4a is a representation of the apparatus represented in FIG. 4, in side elevation view.

DETAILED DESCRIPTION OF THE INVENTION

Figure 3:
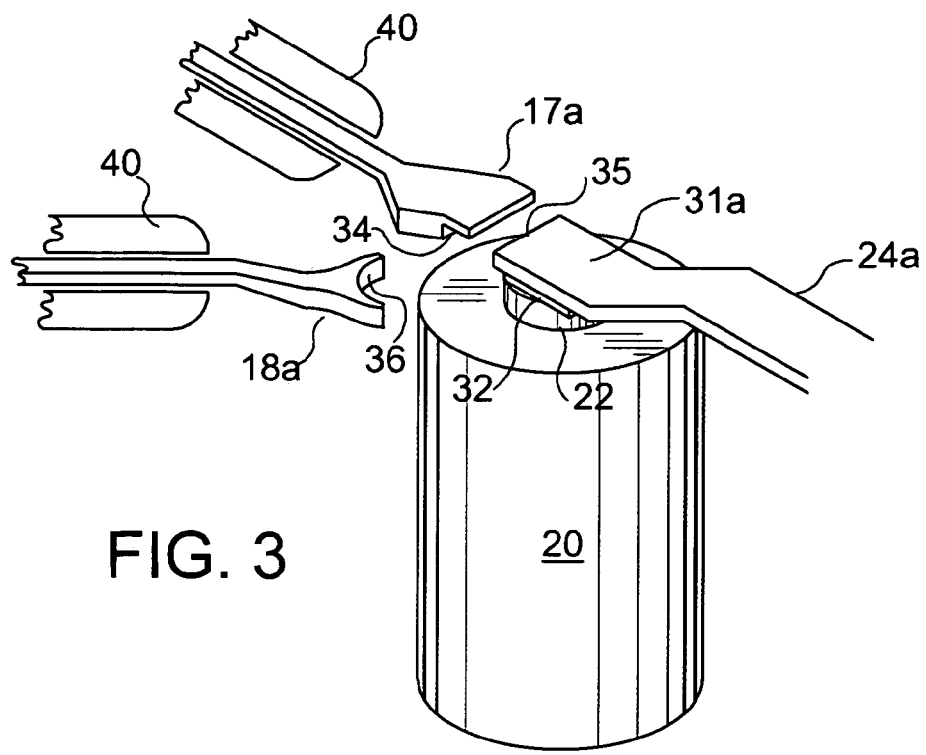
FIG. 3 is a representation, in perspective view, of a joint to be soldered, with contoured probes of a resistance heat solder apparatus used in soldering a battery strap to a post terminal of a dry cell.

FIG. 1 is a block diagram that represents a resistance heat solder apparatus or system, usable in the present invention. A power supply, block 10 of normal 110–120 volt Alternating Current, hereinafter referred to as 110 VAC, provides power for driving the resistance heat solder apparatus. Block 12, CONTROL, includes an ON/OFF switch that may be manual or automatic. The CONTROL block includes a RESET TIMER, which times the ON interval of the resistance heat solder apparatus. The Reset Timer may be adjustable as represented by the arrow. Alternately, a timer may be incorporated into the ON/OFF switch. Block 14 Voltage Reducing Means, represents a means for reducing the voltage level below that of the power supply. The Voltage Reducing Means is represented as a step-down transformer with a primary coil 15 and a secondary coil 16. The secondary coil is adjustable so that the voltage output of the secondary coil may be adjusted, as desired. Other voltage reducing means may be used, if desired. Blocks 17 and 18 represent the output terminals or terminal probes of the secondary coil.

FIG. 2 represents a battery pack fabricated from four (4) 1.5 volt dry cells. Each dry cell 20 is a complete battery which includes a can 21 and a post 22. The post 22 is one terminal of the dry cell and the can 26, a second terminal. Adjacent 1.5 volt dry cells in the battery pack are oppositely oriented with respect to each other. When electrically connected, this orientation provides cells in series connection, defining a dry cell battery of 6.0 volts. The post terminal 22 on one dry cell 20 is connected, both physically and electrically, to the can terminal 26 of an adjacent dry cell. The electrolyte, not shown, is contained in the can 21 of each dry cell. Connection between dry cells is made by an electric conductor, such as a conductive battery strap 24. The can terminal 25 of one end dry cell and the post terminal 27 of another end dry cell provide the output terminals for the dry cell battery. Preferably the dry cells are rechargeable and the battery straps are permanently soldered to the dry cell post terminal and can terminal, as represented in FIG. 2. When the battery is drained of power, the battery may be recharged using an off-the-shelf battery charger, (not shown), made to charge a rechargeable dry cell battery. Dry cell batteries of different voltage, may be fabricated by using fewer or more dry cells in the battery pack.

Figure 4:
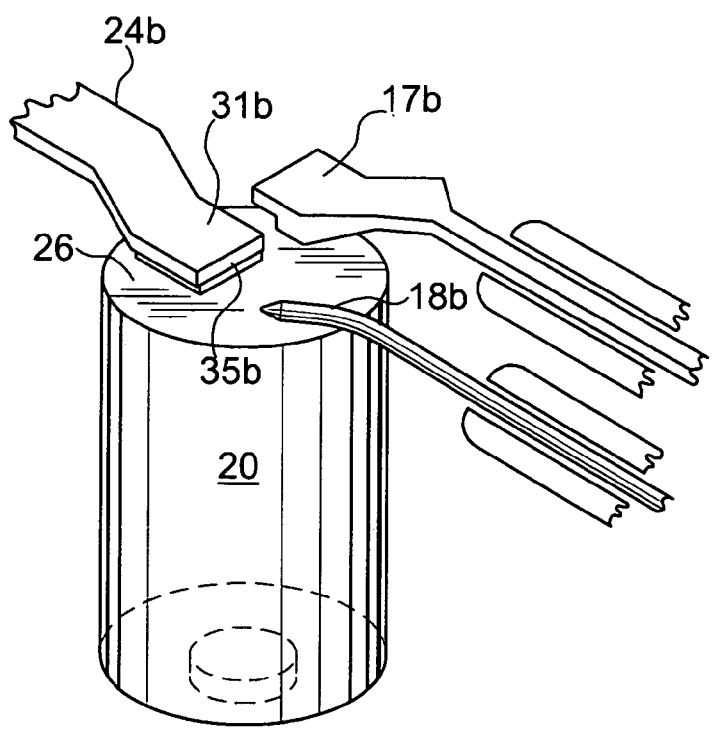
FIG. 4 is a representation, in perspective view, of another joint to be soldered, with contoured probes of a resistance heat solder apparatus used in soldering a battery strap to the can terminal of a dry cell.

FIGS. 3, 3a, 4 and 4a represent junctions between an end portion of a battery strap and a terminal of a dry cell in a battery pack. Terminal probes of a resistance heat solder apparatus the voltage output of the secondary coil across the junction or joint to be soldered. The terminal probes are represented with contoured end portions. Terminal probes represented in FIGS. 4 and 4a are conically contoured. Other terminal probes, in FIGS. 3, 3a, 4 and 4a are contoured in a mirror image of the contour of that part of the junction where the terminal probe makes contact with the junction. In order to solder a junction, the elements defining the junction must be in physical contact. FIGS. 3 and 3a represent a joint to be soldered formed by an end portion 31a of a battery strap 24a and a portion of the post terminal 22 of a dry cell 20. FIGS. 4 and 4a represent a joint to be soldered formed by an end portion 31b of a battery strap 24b and a portion of the can terminal 26 of a dry cell 20.

Referring to FIGS. 3 and 3a, a battery strap 24a, is represented, in part, with a dry cell 20. Terminal probes 17a and 18a are represented, in part, positioned at opposite positions across the joint to be soldered. The contoured ends of the terminal probes are represented. FIG. 3a is a cross-section view representing an end portion of a battery strap representing a core, 30, preferably of copper. Copper is an excellent electric conductor material, with very low resistance characteristics. Preferably the copper core is coated or clad with a thin layer 32 of a conductive material which has good electric conductor characteristics but has more electric resistive characteristics than copper. Steel is a metal that may be used as a coating metal for the copper core. Although the end or tip portion of the terminal probe may be conical, as represented in FIGS. 4 and 4a, preferably, the terminal probe, such as 17a, is contoured so as to mate with the surface with which the terminal probe comes into contact, such as 35. The end portion of tip of the terminal probe may be contoured so as to define an inside shoulder 34, which mates or conforms with the outer/upper contour of an edge the battery strap 35. The terminal probe 18a is contoured defining an inside curve 36 that mates or conforms with the outer curve of the post terminal 22. This provides contact on defined surfaces on opposite sides or opposite ends of the joint to be soldered. When the resistance heat solder apparatus is activated, a current flow path, through the joint to be soldered, between the two terminal probes in contact with opposing surfaces, across the solder joint, is created. Current flow through the path between the terminal probes generates heat in the conductor material of the joint to be soldered. The intensity of the heat generated in the current flow path through the body of the joint, is a function of the voltage applied across the joint to be soldered and the resistivity of the materials in the current path of the joint to be soldered.

Preferably, a layer of solder 33, is applied to a surface of the battery strap, between the battery strap and the dry cell terminal. For practical purposes, each terminal probe includes an insulating handle or cover, 40, to prevent electric contact between the hand of a person and the terminal probe, if soldering is done manually.

Referring to FIGS. 4 and 4a, a joint to be soldered is represented by an end portion 31b of a battery strap 24b, in junction with the can terminal 26 of the dry cell 20. A contoured terminal probe 17b is represented. The contour of the terminal probe 17b, which is contoured so as to define a mirror image of the end shoulder 35b of the end portion 31b, may be similar in contour to the probe 17a, in FIGS. 3 and 3a. This is because in fabricating the battery strap, both ends are made essentially identical so that either end of the battery strap may be used as part of the joint with either dry cell terminal. However, the terminal probe 18b is contoured to be conical, providing a positive contact with the can terminal 26.

It should be noted that in practicing the invention the elements that define a joint to be soldered, should be in physical contact so that electrical contact is continuous across the joint. The terminal probes of the resistance heat solder apparatus should be in positive contact with separated, preferably opposing, portions of the joint to be soldered, when the resistance heat solder apparatus is activated. Care should be taken to limit activation of the resistance heat solder apparatus so that heat generated within the materials defining the joint is of sufficient intensity to liquidate the solder but not excessive so as to excessively heat the materials adjacent the joint to be soldered.

In the foregoing description of the invention, referenced to the drawings, certain terms have been used for conciseness, clarity and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented or described.

Having now described a preferred embodiment of the invention, in terms of features, discoveries and principles, along with certain alternative construction and suggested changes, other changes that may become apparent to those skilled in the art may be made, without departing from the scope of the invention defined in the appended claims.

What is claimed is:

1. A method for soldering a junction defined by a portion of a battery strap in physical contact with a terminal of a dry cell for electrically and physically connecting said battery strap to said terminal for fabricating a dry cell storage battery including the steps of:
   a) determining the resistivity to current flow of the materials defining said junction to be soldered;
   b) determining a value of a first voltage which when applied across said junction, having said determined resistivity, will generate a heat within said junction, sufficient to melt a solid solder placed within said junction into a liquid state solder;
   c) generating a second voltage having said value of said first voltage;
   d) applying said second voltage across said junction for generating heat within said junction for soldering said portion of said battery strap to said terminal; and
   e) limiting a duration of application of said second voltage using an ON/OFF timer element in a circuit associated with application of said second voltage.

2. A method as in claim 1 wherein said second voltage is generated within a second coil of a dual coil step-down transformer.

3. A method for fabricating a dry storage battery from a plurality of dry cells comprising the steps of:
   a) positioning a plurality of dry cells in juxtaposition with respect to one another, with terminals of adjacent dry cells of said plurality of dry cells oriented in opposite orientation, defining a battery pack;
   b) positioning a battery strap on adjacent dry cells, of said plurality of dry cells, so that a first end of said battery strap connects with a first terminal on a first dry cell of said adjacent dry cells, for defining a first solder joint, and a second end of said battery strap connects with a second terminal of a second dry cell, of said adjacent dry cells for defining a second solder joint;
   c) making contact between a first probe of a resistance heat solder system and said first end of said battery strap;
   d) making contacting between a second probe of said resistance heat solder system and said first terminal of said first dry cell; and,
   e) activating said resistance heat solder system for a timed interval, timed by an ON/OFF timer, for applying a voltage across said first solder joint, between said first probe and said second probe for a predetermined time interval, for heating a collimated path through said first solder joint, for said predetermined time interval for soldering said first solder joint.

4. An apparatus for fabricating a dry storage battery from a plurality of dry cells by soldering a battery strap means to terminals of adjacently positioned dry cells and using a resistance heat solder system for soldering solder joints, comprising:
   a) a resistance heat solder system including
      i) a connection to a source of power having a first voltage level for driving said resistance heat solder system,
      ii) an ON/OFF timer element between said power source and said connection for controlling an ON time interval of said resistance heat solder system;
      iii) a voltage reducing means for reducing said first voltage level of said source of power to a second voltage level,
      iv) a probe means for applying a second voltage at said second voltage level across a joint to be soldered, for a predetermined time interval, timed by said ON/OFF timer element, said joint to be soldered defined by a terminal of a dry cell, of said plurality of dry cells, in physical contact with an end section of said battery strap means; and
   b) said probe means includes a first probe terminal and a second probe terminal, said first probe terminal for contacting said first terminal of said dry cell, said second probe terminal for contacting said end section of said battery strap means defining said joint, for driving said second voltage across said joint during said predetermined time interval.

5. An apparatus as in claim 4 wherein said voltage reducing means includes a step-down transformer driven during said ON time interval.

6. An apparatus as in claim 4 and further including a layer of solder between said terminal of said dry cell and said end section of said battery strap means for liquefying when heat is generated in said joint during said time interval.

7. An apparatus for fabricating a dry cell storage battery from a plurality of dry cells formed to define a battery pack by soldering a battery strap means to terminals of dry cells in juxtaposition using a resistance heat soldering means for soldering junctions defined by a portion of said battery strap and a terminal of a dry cell of said plurality of dry cells comprising:
   a) a resistance heat solder means including
      i) a connection to a source of power defined by a first voltage at a first level for driving said resistance heat solder means;
      ii) a voltage reducing means for reducing said first voltage to a second voltage at a second voltage level;
      iii) a first terminal probe means and a second terminal probe means coupled to said voltage reducing means for applying said second voltage across a junction defined by said portion of said battery strap and said terminal of said dry cell;

b) means for activating said resistance heat solder means when said first terminal probe and said second terminal probe are in contact with opposing portions of said junction; and c) an ON/OFF timer element connected to said activating means for controlling an ON time duration of said activating means.

8. A method for fabricating a dry cell storage battery from a plurality of dry cells using a resistance heat solder apparatus controlled by an ON/OFF timer, for soldering junctions during a timed interval for electrically and physically connecting dry cells comprising the steps of:

a) forming a plurality of dry cells into a battery pack with each dry cell of said plurality of dry cells aligned in juxtaposition with an adjacent dry cell of said plurality of dry cells;

b) positioning a battery strap means so that a first end portion of said battery strap means forms a first junction with a first terminal of a first dry cell of said plurality of dry cells and a second end portion of said battery strap means forms a second junction with a second terminal of a second dry cell of said plurality of dry cells, said first dry cell aligned in juxtaposition with said second dry cell;

c) applying a first voltage generated by a first resistance solder means for a first predetermined time interval, timed by an ON/OFF timer element, across said first junction for heat soldering said first junction; and d) applying a second voltage generated by a second resistance solder means for a second predetermined time interval, timed by said ON/OFF timer element, across said second junction for heat soldering said second junction.

9. A method as in claim 8 wherein said first dry cell and said second dry cell are oriented so that a post terminal of said first dry cell is adjacent a can terminal of said second dry cell.

10. A method as in claim 9 wherein said post terminal is a positive terminal of said each dry cell of said plurality of dry cells and said can terminal is a negative terminal of said each dry cell of said plurality of dry cells.

11. A method as in claim 9 wherein said post terminal is a negative terminal of each said dry cell of said plurality of dry cells and said can terminal is a positive terminal of each said dry cell of said plurality of dry cells.

12. A method as in claim 8 wherein said first dry cell and said second dry cell are oriented so that a post terminal of said first dry cell is adjacent a post terminal of said second dry cell.

* * * * *